United States Patent
Bae et al.

(10) Patent No.: US 9,729,183 B2
(45) Date of Patent: Aug. 8, 2017

(54) MOBILE TERMINAL CASE AND METHOD OF MANUFACTURING THE SAME

(71) Applicant: Samsung Electronics Co., Ltd., Gyeonggi-do (KR)

(72) Inventors: Kwangjin Bae, Gyeongsangbuk-do (KR); Heecheul Moon, Gyeonggi-do (KR); Iksu Jung, Gyeonggi-do (KR); Jongchul Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 140 days.

(21) Appl. No.: 14/044,369

(22) Filed: Oct. 2, 2013

(65) Prior Publication Data

US 2014/0100005 A1  Apr. 10, 2014

(30) Foreign Application Priority Data

Oct. 5, 2012 (KR) ........................ 10-2012-0110426

(51) Int. Cl.
*H04M 1/00* (2006.01)
*H04B 1/3888* (2015.01)
(Continued)

(52) U.S. Cl.
CPC ............. *H04B 1/3888* (2013.01); *B05D 3/12* (2013.01); *B29C 33/424* (2013.01);
(Continued)

(58) Field of Classification Search
CPC ............ B05B 13/0242; B05D 2202/25; B05D 2350/40; B05D 5/06; B05D 5/061; B05D 3/12; B29C 70/30; B29C 33/424; B29C 45/1418; B29C 45/14336; B29C 45/14688; B29C 45/14786; C25D 11/243; D03D 1/0058; H04M 1/0202; H04M 1/185; H04M 1/0283; H04M 1/18; H04M 1/0214;
(Continued)

(56) References Cited

U.S. PATENT DOCUMENTS 4,296,561 A * 10/1981 Lawrence ................ A47G 1/06
40/748
4,651,312 A *  3/1987 Honma ................ G11B 31/003
343/702
(Continued)

FOREIGN PATENT DOCUMENTS

CN      201644332    11/2010
CN      102099204     6/2011
(Continued)

OTHER PUBLICATIONS

Chinese Office Action dated May 24, 2017 issued in counterpart application No. 201310464592.8, 14 pages.

*Primary Examiner* — Kathy Wang-Hurst
*Assistant Examiner* — B. M. M Hannan
(74) *Attorney, Agent, or Firm* — The Farrell Law Firm, P.C.

(57) ABSTRACT

A mobile terminal case and a method of manufacturing the same are provided. The mobile terminal case includes a three-dimensional curved body or plane shape having a circumferential edge lower than its center and formed from a fiber reinforced composite material; and a gradation paint layer formed at an outer surface of the body formed from fiber reinforced composite material.

7 Claims, 12 Drawing Sheets

(51) Int. Cl.
*H04M 1/02* (2006.01)
*B05D 3/12* (2006.01)
*B29C 45/14* (2006.01)
*B29C 33/42* (2006.01)
*B29L 31/34* (2006.01)

(52) U.S. Cl.
CPC .... *B29C 45/1418* (2013.01); *B29C 45/14336* (2013.01); *B29C 45/14688* (2013.01); *B29C 45/14786* (2013.01); *H04M 1/0283* (2013.01); *B29L 2031/3437* (2013.01)

(58) Field of Classification Search
CPC .............. A45C 11/00; A45C 2011/003; A45C 2013/025; A45C 2011/002; H04B 1/3888; B29L 2031/3437
USPC ........... 455/575.1, 575.8; 427/236, 274, 402, 427/425; 118/315; 29/527.1; 264/129
See application file for complete search history.

(56) References Cited

U.S. PATENT DOCUMENTS

| | | | | |
|---|---|---|---|---|
| D649,539 S * | 11/2011 | Hong | ............. | H04B 1/3888 D14/250 |
| D677,249 S * | 3/2013 | Li | ............. | H04B 1/3888 D14/250 |
| D685,779 S * | 7/2013 | Schriefer | ............. | H04B 1/3888 D14/250 |
| 8,619,414 B2 * | 12/2013 | Lee | ............. | H04N 5/64 345/214 |
| 8,676,281 B1 * | 3/2014 | Caulder | ............. | H04M 1/0283 455/575.1 |
| 8,834,990 B2 | 9/2014 | Kim et al. | | |
| 8,857,128 B2 | 10/2014 | Kenney | | |
| 2003/0181259 A1 * | 9/2003 | Shimazaki | ............. | A63B 53/047 473/350 |
| 2004/0159555 A1 * | 8/2004 | Purdy | ............. | B05D 7/16 205/198 |
| 2008/0227507 A1 * | 9/2008 | Joo | ............. | H04M 1/0266 455/575.8 |
| 2008/0317989 A1 * | 12/2008 | Abe | ............. | B29C 45/1646 428/36.9 |
| 2009/0169838 A1 * | 7/2009 | Yamaguchi | ............. | B05D 5/06 428/201 |
| 2010/0034977 A1 * | 2/2010 | Kim | ............. | B05D 5/061 427/402 |
| 2011/0100857 A1 * | 5/2011 | Wang | ............. | B65D 23/00 206/524.1 |
| 2011/0101838 A1 * | 5/2011 | Tooker | ............. | D06F 39/14 312/326 |
| 2011/0123778 A1 * | 5/2011 | Kim | ............. | B44C 1/22 428/172 |
| 2013/0001993 A1 * | 1/2013 | Kurata | ............. | A47C 7/48 297/284.4 |
| 2013/0071685 A1 * | 3/2013 | Iwaki | ............. | B05D 5/067 428/621 |
| 2013/0137327 A1 * | 5/2013 | Tseng | ............. | H04B 1/08 442/229 |
| 2013/0147330 A1 * | 6/2013 | DiFonzo | ............. | G06F 1/1656 312/297 |
| 2013/0292281 A1 * | 11/2013 | Chung | ............. | H04B 1/3888 206/320 |

FOREIGN PATENT DOCUMENTS

| | | |
|---|---|---|
| CN | 102458060 | 5/2012 |
| CN | 102461352 | 5/2012 |

* cited by examiner (a)

(b)

(c)

(d)

MOBILE TERMINAL CASE AND METHOD OF MANUFACTURING THE SAME

PRIORITY

This application claims priority under 35 U.S.C. §119(a) to a Korean patent application filed on Oct. 5, 2012 in the Korean Intellectual Property Office and assigned Serial No. 10-2012-0110426, the contents of which are incorporated herein by reference.

BACKGROUND OF THE INVENTION

1. Field of the Invention

The present invention relates generally to a mobile terminal case and a method of manufacturing the same, and more particularly, to a mobile terminal case and method of manufacturing that provides an enhanced external appearance and solidity through various surface treatment methods of a mobile terminal case made of a fiber reinforced composite material.

2. Description of the Related Art

In general, a mobile terminal is an electronic device which a user can carry and perform wireless communication with another party. The trends in mobile terminals are towards smaller sizes, smaller thicknesses, and lighter weights in consideration of portability and advances in the performance of multimedia functions.

In modern society, mobile terminals are very important and widely used. Further, a mobile terminal represents the individuality of its user.

In the past, mobile terminals have been designed in consideration of only a model and a shape thereof, but nowadays, fashion, individuality, living level, elegance, and employment characteristics of the consumer are all factors in selecting a design of the mobile terminal.

Further, consumers purchase mobile terminals considering the functions and characteristics as well as the shape of the mobile terminal.

In response to customer preference, mobile terminal cases have been provided in various designs usually as an injection molding product.

However, most injection molding products have been designed giving importance to the shape and the pattern of the product, thereby requiring, in terms of design development, additional actions after the injection molding product is produced, such as screen printing a pattern or transferring a pattern using transfer paper.

However, when a pattern is formed in a case using screen printing or transfer paper, a form thereof is coarse, and over time, gloss and color fade and thus decoration should be newly performed, i.e., the life-span of such design elements is limited.

Therefore, in order to respond to customer demand, a mobile terminal case and a method of manufacturing the same are needed that provide rigidity and an enhanced external appearance to a mobile terminal while using a unique material.

SUMMARY OF THE INVENTION

The present invention has been made to address at least the above problems and disadvantages, and to provide at least the advantages described below. Accordingly, an aspect of the present invention provides a mobile terminal case and a method of manufacturing the same which provides individuality and beauty of design by producing a hairline pattern in the external surface of a mobile terminal case while it is being formed by injection molding of a fiber reinforced composite material.

Another aspect of the present invention provides a mobile terminal case and a method of manufacturing the same that provides individuality and beauty of design by preventing internal parts from being shown, i.e., by hiding internal parts while expressing a textile fabric impression in the external surface of the mobile terminal case through gradation paint processing.

In accordance with one aspect of the present invention, a mobile terminal case includes a three-dimensional curved body having an outer edge with a circumferential edge lower than a center and formed from a fiber reinforced composite material; and a gradation paint layer formed on the outer surface of the three-dimensional curved body formed from the fiber reinforced composite material.

In accordance with another aspect of the present invention, a mobile terminal case includes an outer surface formed from a fiber reinforced composite material and having a hairline pattern formed thereon; and a gradation paint layer formed on the outer surface and internal portions of the mobile terminal case where parts of a mobile terminal are mounted, where the gradation paint layer has a different level of transparency on the internal portions of the mobile terminal case where the parts of the mobile terminal are mounted.

In accordance with another aspect of the present invention, a mobile terminal case includes a three-dimensional curved body having a circumferential edge lower than a center, where the body is formed from a fiber reinforced composite material; and an outer surface of the body having a hairline pattern formed therein.

In accordance with another aspect of the present invention, a method of manufacturing a mobile terminal case includes loading a fiber reinforced composite material on an injection mold having a hairline pattern on an internal wall; forming the hairline pattern on an outer surface of the fiber reinforced composite material by compressing the fiber reinforced composite material against on the injection mold; unmolding the fiber reinforced composite material in which the hairline pattern is formed; and forming a gradation paint layer at the outer surface of the fiber reinforced composite material having the hairline pattern.

In accordance with another aspect of the present invention, a method of manufacturing a mobile terminal case includes loading a mold release film in which a hairline pattern is formed on an injection mold; loading a fiber reinforced composite material on the mold release film; forming the hairline pattern of the mold release film at an outer surface of the fiber reinforced composite material by compressing the mold release film and the fiber reinforced composite material loaded on the injection mold; unmolding the fiber reinforced composite material in which the hairline is formed; and forming a gradation paint layer at the outer surface of the fiber reinforced composite material on which the hairline pattern is formed.

BRIEF DESCRIPTION OF THE DRAWINGS

The objects, features and advantages of the present invention will be more apparent from the following detailed description in conjunction with the accompanying drawings, in which.

DETAILED DESCRIPTION OF EMBODIMENTS OF THE PRESENT INVENTION

Figure 1:
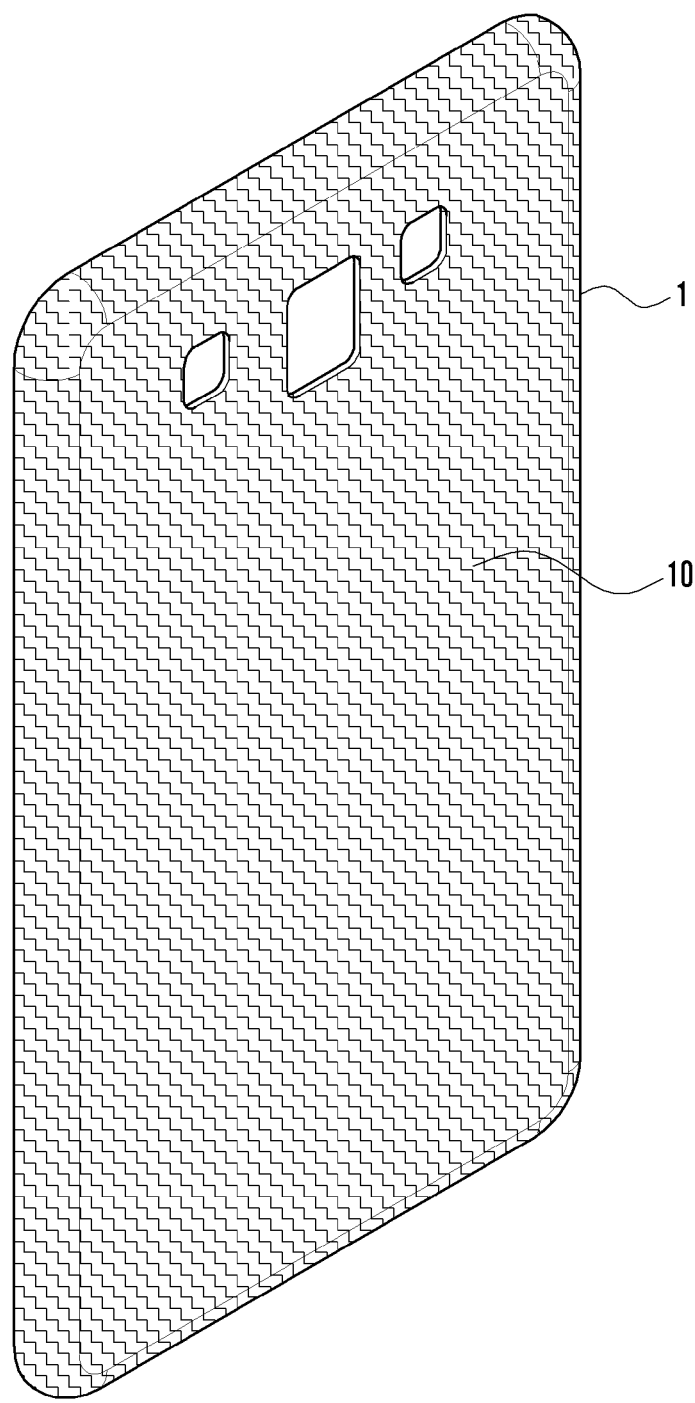
FIG. 1 is a perspective view illustrating a mobile terminal case formed with a fiber reinforced composite material in which a hairline pattern is engraved according to an embodiment of the present invention.

Hereinafter, embodiments of the present invention are described in detail with reference to the accompanying drawings. The same reference numbers are used throughout the drawings to refer to the same or like parts. The views in the drawings are schematic views only, and are not intended to be to scale or correctly proportioned. Detailed descriptions of well-known functions and structures are omitted to avoid obscuring the subject matter of the present invention.

In the present invention, a mobile terminal may be any portable electronic device with a touch screen, such as a mobile phone, smart phone, tablet personal computer (PC), and laptop PC. In the present invention, an accessory indicates an accessory of the mobile terminal that can be separated from the mobile terminal and may be, for example, a pen, headphone, and keypad for touching a touch screen.

A mobile terminal according to an embodiment of the present invention may be a tablet PC, mobile communication terminal, mobile phone, Personal Digital Assistant (PDA), smart phone, International Mobile Telecommunication 2000 (IMT-2000) terminal, Code Division Multiple Access (CDMA) terminal, Wideband Code Division Multiple Access (WCDMA) terminal, Global System for Mobile communication (GSM) terminal, General Packet Radio Service (GPRS) terminal, Enhanced Data GSM Environment (EDGE) terminal, Universal Mobile Telecommunication Service (UMTS) terminal, digital broadcasting terminal, and an Automated Teller Machine (ATM).

FIG. 1 is a perspective view illustrating a mobile terminal case formed with a fiber reinforced composite material in which a hairline is engraved according to an embodiment of the present invention.

Referring to FIG. 1, a mobile terminal case 1 is formed as a bar type mobile terminal. However, a mobile terminal case according to embodiments of the present invention is not limited thereto and can be applied to various structures of mobile terminal cases including a slide type, folder type, swing type, and swivel type.

Further, the mobile terminal case 1 may be a casing, housing, and cover forming an external appearance of the mobile terminal. Embodiments of the present invention may be applied to both the front case which covers the front surface of the mobile terminal and the rear case 10 which covers the rear surface thereof; however, only a structure of the rear case 10 is described herein in detail.

The mobile terminal case 1 may be formed by injecting a synthetic resin or may be made of a metal material, for example stainless steel (SUS) or titanium (Ti).

In the present embodiment, the mobile terminal case 1 is produced using Glass Fiber Reinforced Plastic (GFRP), which is a kind of a fiber reinforced composite material. More particularly, GFRP is a kind of prepreg, a fiber reinforced composite material produced by mixing unsaturated polyester, epoxy resin, and poly amide resin of a uniform content in a high elastic reinforced material of a glass fiber, carbon fiber, Kevlar fiber. For example, GFRP may be formed by coating an epoxy layer on glass fiber. The fiber reinforced composite material may be alternately stacked in a multi layer state. Such a fiber reinforced composite material is characterized by having strong elasticity of high strength.

In short, the fiber reinforced composite material may be formed with prepreg including at least one of carbon fiber reinforced plastic, aramid fiber (Kevlar) reinforced plastic, boron fiber reinforced plastic, and basalt fiber reinforced plastic.

In the present embodiment, a predetermined pattern is formed in the outer surface of the mobile terminal case 1 when the mobile terminal case is formed by performing injection molding of a fiber reinforced composite material. The predetermined pattern may be a hairline pattern.

The hairline pattern may be scratches, unevenness, or predetermined grooves formed in the surface of a fiber reinforced composite material.

Figure 2:
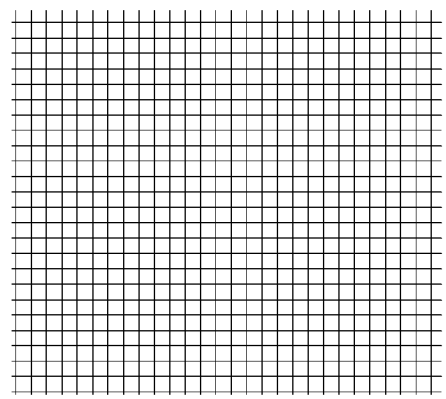
FIG. 2 is a diagram illustrating various patterns which can be formed on the fiber reinforced composite material of FIG. 1 according to embodiments of the present invention.
Figure 2:
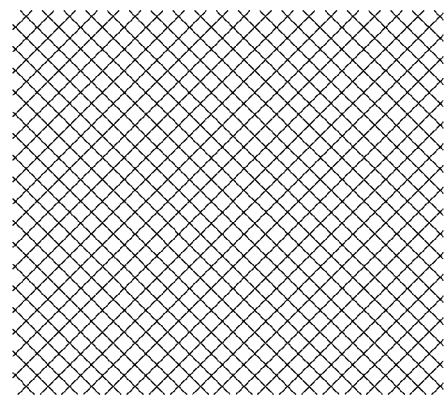
Figure 2:
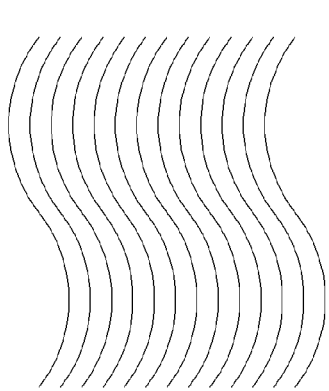
Figure 2:
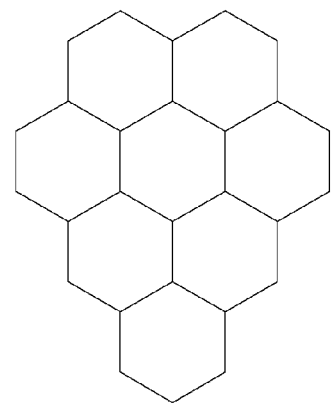

Further, as shown in FIG. 2, the predetermined pattern may be a grid pattern (a), diagonal grid pattern (b), wave pattern (c), and/or hive pattern (d), and/or may be formed in various patterns such as an oblique pattern, polygonal pattern, and/or a stripe pattern not shown in FIG. 2.

In this way, in the present embodiment, by embodying a hairline pattern in the external surface of the mobile terminal while forming the injection molding product using a fiber reinforced composite material, individuality and beauty of design can be created.

Hereinafter, a process of forming the mobile terminal case 1 with the fiber reinforced composite material and forming a predetermined pattern in its external surface is described in detail with reference to FIGS. 3 to 6.

Figure 3:
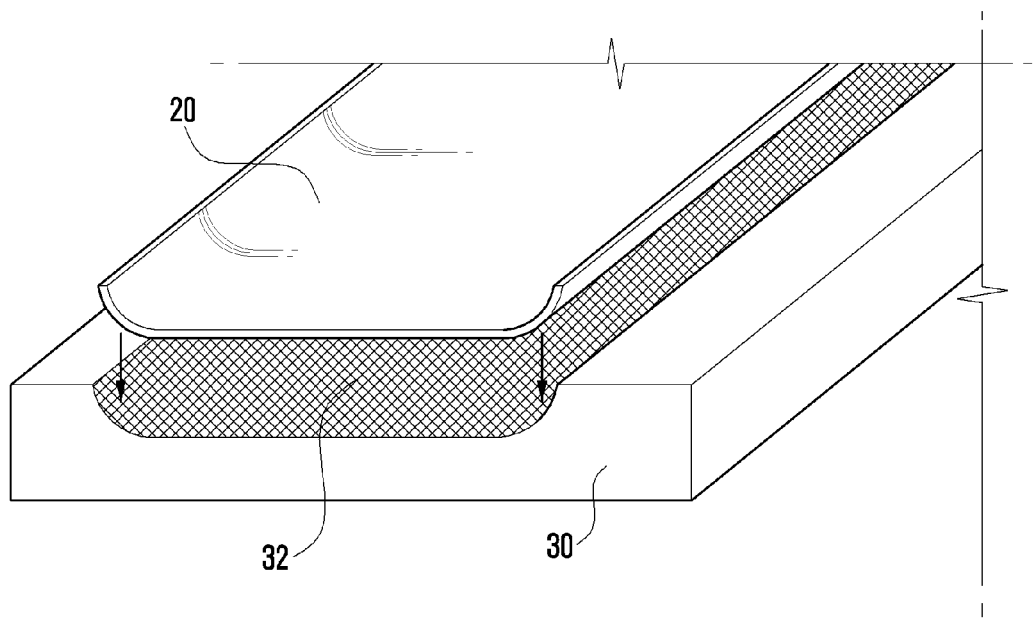
FIG. 3 is a perspective view illustrating a portion of a process of forming a predetermined pattern in the outer surface of a mobile terminal case using an injection mold in which the predetermined pattern is engraved according to an embodiment of the present invention.
Figure 4:
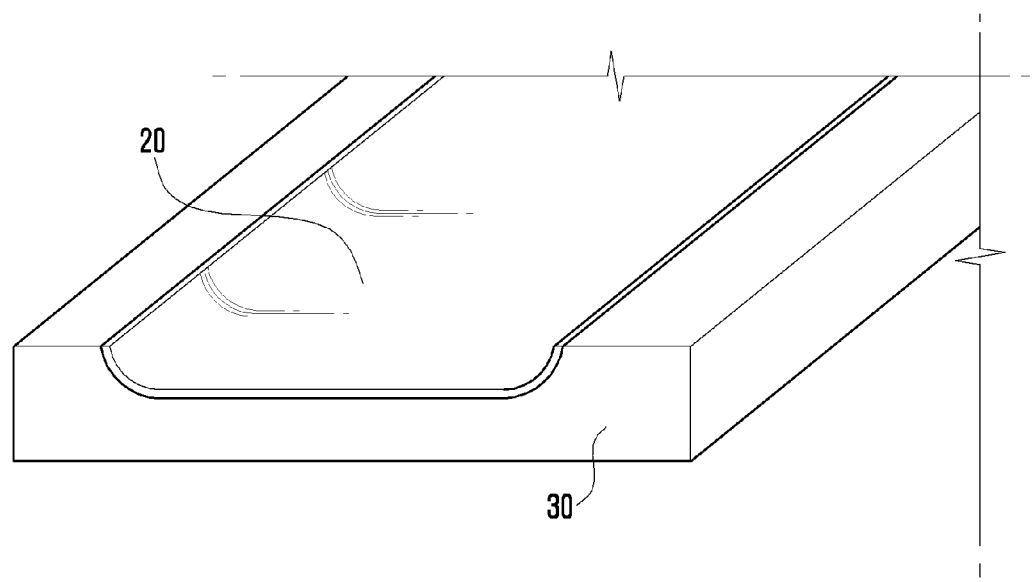
FIG. 4 is a perspective view illustrating a process of compressing fiber reinforced composite material by the injection mold of FIG. 3 according to an embodiment of the present invention.
Figure 5:
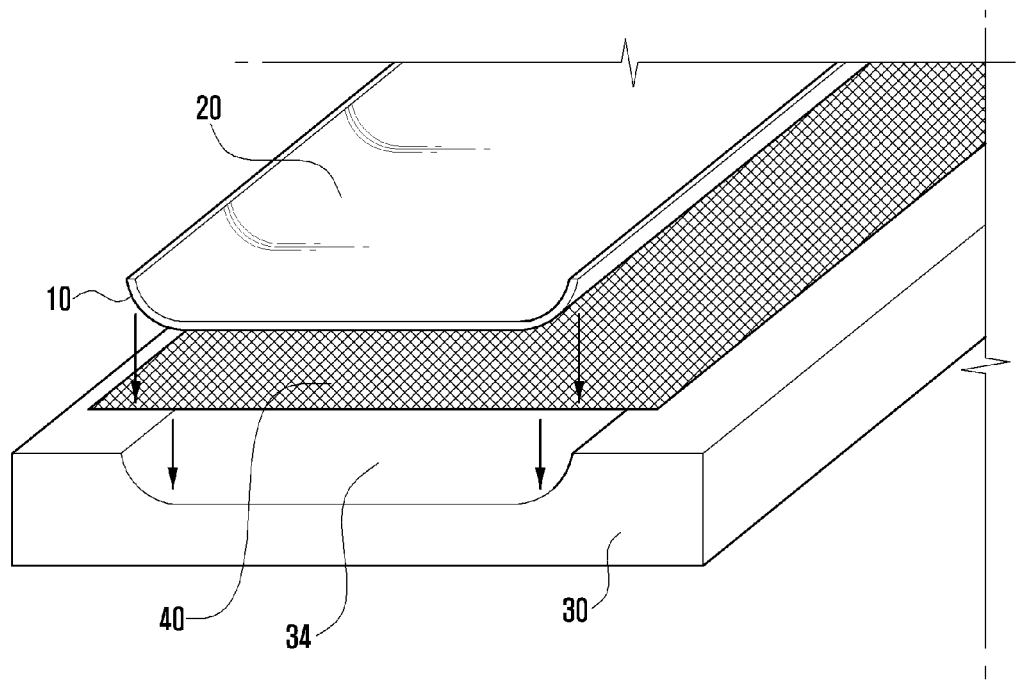
FIG. 5 is a perspective view illustrating a portion of a process of forming a predetermined pattern on the outer surface of a mobile terminal case using an injection mold and a mold release film in which a predetermined pattern is engraved according to an embodiment of the present invention.
Figure 6:
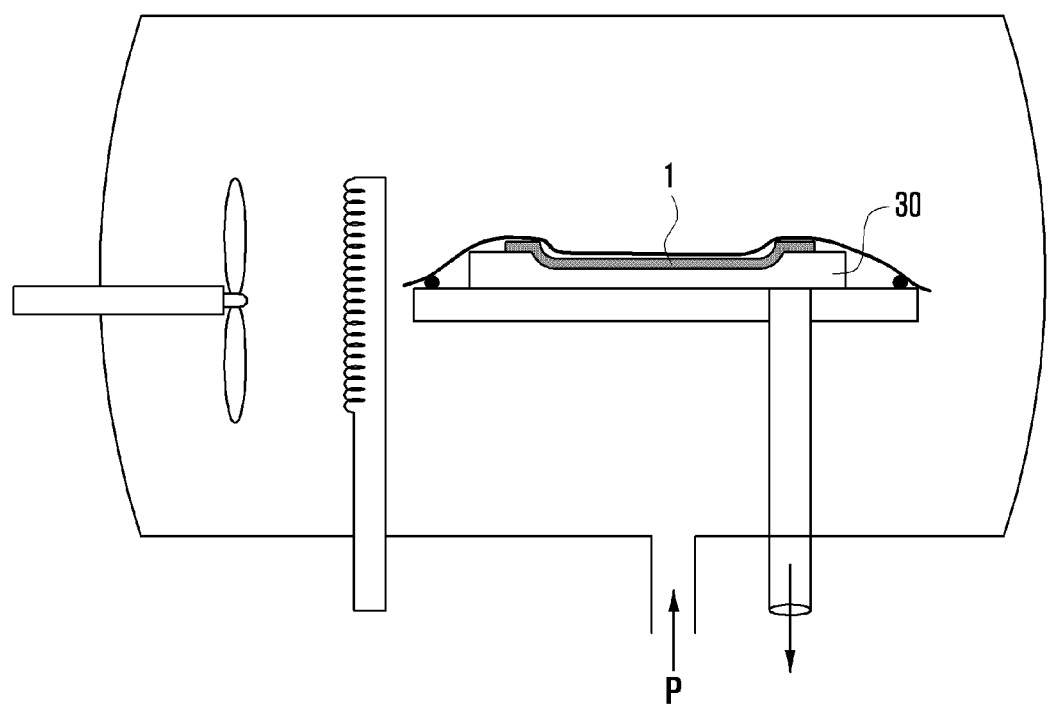
FIG. 6 is a diagram illustrating a chamber for shaping a mobile terminal case by injection molding.

FIG. 3 is a perspective view illustrating a portion of a process of forming a predetermined pattern in the outer surface of a mobile terminal case using an injection mold in which a predetermined pattern is engraved according to an embodiment of the present invention, FIG. 4 is a perspective view illustrating a process of compressing a fiber reinforced composite material by the injection mold of FIG. 3 according to an embodiment of the present invention, FIG. 5 is a perspective view illustrating a portion of a process of forming a predetermined pattern in the outer surface of a mobile terminal case using an injection mold with no engraved pattern and a mold release film in which a predetermined pattern is engraved according to an embodiment of the present invention, and FIG. 6 is a diagram illustrating a chamber for shaping a mobile terminal case according to an embodiment of the present invention.

Referring to FIG. 3, in order to manufacture the mobile terminal case 1, an engraved core portion 32 is etched to a predetermined depth in a portion of an injection mold 30.

That is, the injection mold 30 includes the engraved core portion 32 etched to a predetermined depth and a shape of the mobile terminal case 1 to be manufactured by shaping a fiber reinforced composite material with the injection mold 30.

At the inside of the engraved core portion 32, a predetermined pattern may be engraved, and the predetermined pattern will be embodied in the external surface of the mobile terminal case 1.

A predetermined pattern within the engraved core portion 32 may be engraved using, for example, a laser or a grinding device at the inside surface of the engraved core portion 32 and may be formed of thin grooves, scratches, or unevenness according to the desired design shape. The predetermined pattern may be a hairline pattern, grid pattern, and/or weaving pattern.

Alternatively, the engraved core portion 32 may be engraved with at least one of various patterns such as the grid pattern in FIG. 2(a), the diagonal grid pattern in FIG. 2(b), the wave pattern in FIG. 2(c), and/or the hive pattern in FIG. 2(d), and/or with an oblique pattern, polygonal pattern, and stripe pattern not shown.

A fiber reinforced composite material 20 is loaded in a predetermined thickness on the injection mold 30 including the engraved core portion 32. The predetermined thickness of the fiber reinforced composite material 20 may be varied by stacking, for example, a plurality of layers on the injection mold 30.

In the present embodiment of the present invention, the portion to be the outer surface of the mobile terminal case 1 is loaded to face the engraved core portion 32 and comes into close contact with the engraved core portion 32 and/or is compressed to the engraved core portion 32.

For this, in the chamber shown in FIG. 6, having an environment of a predetermined high temperature and high pressure, the fiber reinforced composite material 20 is loaded on the injection mold 30 including the engraved core portion 32. Thereafter, the fiber reinforced composite material 20 contacts the injection mold 30 closely and the fiber reinforced composite material 20 is compressed to the injection mold 30 including the engraved core portion 32.

That is, by vacuum compressing in the sealed space of the chamber environment, the fiber reinforced composite material 20 contacts the injection mold 30 closely and the fiber reinforced composite material 20 is compressed to the injection mold 30.

The fiber reinforced composite material 20 forms a shape of the mobile terminal case 1 and may be provided in a three-dimensional curved surface form or plane form having a circumferential edge lower than the center.

The fiber reinforced composite material 20 is formed in a shape of the mobile terminal case 1 by loading the fiber reinforced composite material 20 of an original form on the engraved core portion 32 and then compressing it to the engraved core portion 32.

As shown in FIG. 4, by compressing the outer surface of the fiber reinforced composite material 20 facing the engraved core portion 32, a predetermined engraved pattern engraved in the engraved core portion 32 may be formed at an outer surface of the fiber reinforced composite material 20. Thereby, a predetermined pattern may be formed at an outer surface of the mobile terminal case 1.

The mobile terminal case 1 shown in FIG. 1 is finally formed through a process including a process shown in FIGS. 3, 4, and 6.

FIG. 5 is a perspective view illustrating a portion of a process of forming a predetermined pattern at an outer surface of a mobile terminal case using an injection mold with no engraved pattern and a mold release film in which a predetermined pattern is engraved according to an embodiment of the present invention.

Referring to FIG. 5, when no pattern is formed in the injection mold 30 for forming the mobile terminal case 1, i.e., acore portion 34, a mold release film 40 in which a predetermined pattern is engraved may be used.

The mold release film 40 in which a predetermined pattern is engraved is placed between the injection mold 30 having no pattern in the core portion 34 and the fiber reinforced composite material 20 so as to come into close contact with the injection mold 30 later.

A predetermined pattern may be engraved on the surface of the mold release film 40 by, for example, one or more lasers or various grinding devices, and may thinly form grooves, scratches or unevenness to correspond to a desired design shape.

The predetermined pattern may be a hairline pattern, grid pattern, and weaving pattern. The hairline pattern may be a shape or design formed of scratches, unevenness, or grooves on the surface of the mold release film 40.

Alternatively, the mold release film 40 may have at least one of various patterns such as the grid pattern in FIG. 2(a), the diagonal grid pattern in FIG. 2(b), the wave pattern in FIG. 2(c), and/or the hive pattern in FIG. 2(d), and/or an oblique pattern, polygonal pattern, and stripe pattern.

For this purpose, in the chamber shown in FIG. 6, having an environment of a predetermined high temperature and high pressure, by vacuum compressing the space in which the fiber reinforced composite material 20 and the mold release film 40 are loaded on the injection mold 30, the fiber reinforced composite material 20 and the mold release film 40 contact the injection mold 30 closely and then are compressed to the injection mold 30.

Accordingly, the predetermined pattern engraved in the mold release film 40 is formed in the glass fiber reinforcement plastic 20.

Thus, a mobile terminal case according to an embodiment of the present invention may be formed through the process shown in FIGS. 5 and 6.

Hereinafter, a structure and method for forming a gradation paint layer on the external surface of a mobile terminal case according to an embodiment of the present invention are described with reference to FIGS. 7 to 10.

Figure 7:
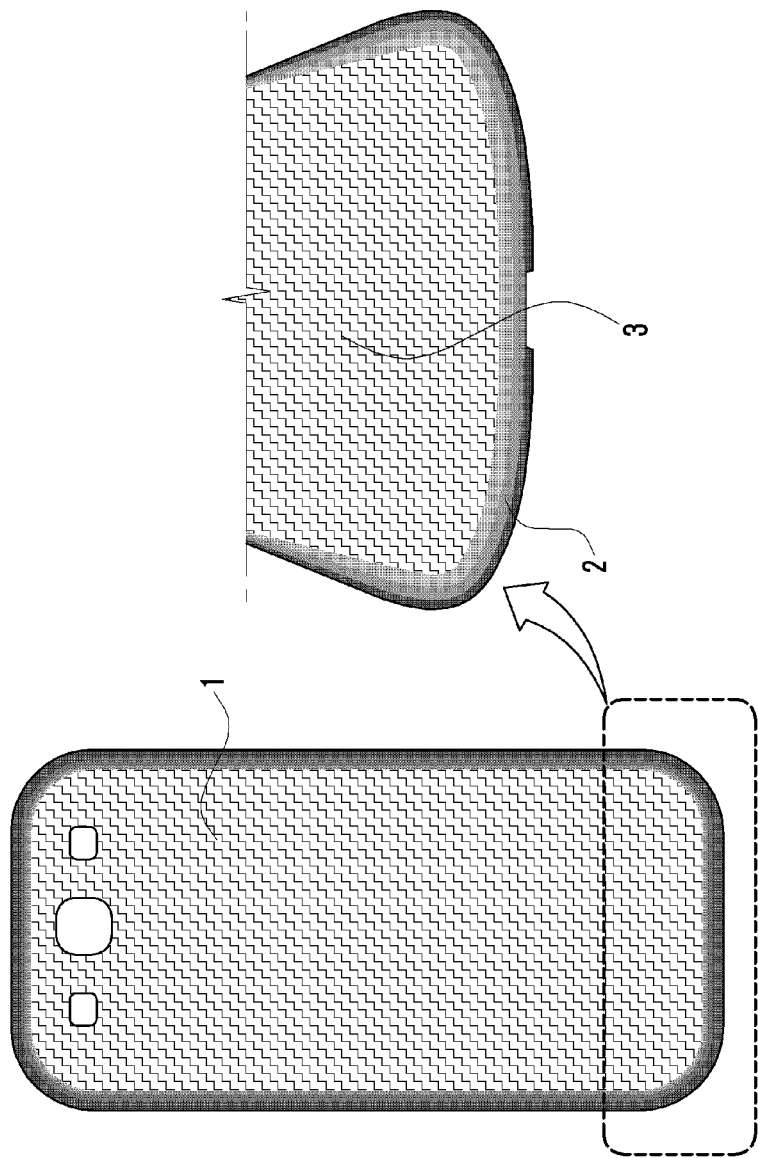
FIG. 7 is a perspective view illustrating a mobile terminal case with a gradation paint layer in its external surface according to an embodiment of the present invention.
Figure 8:
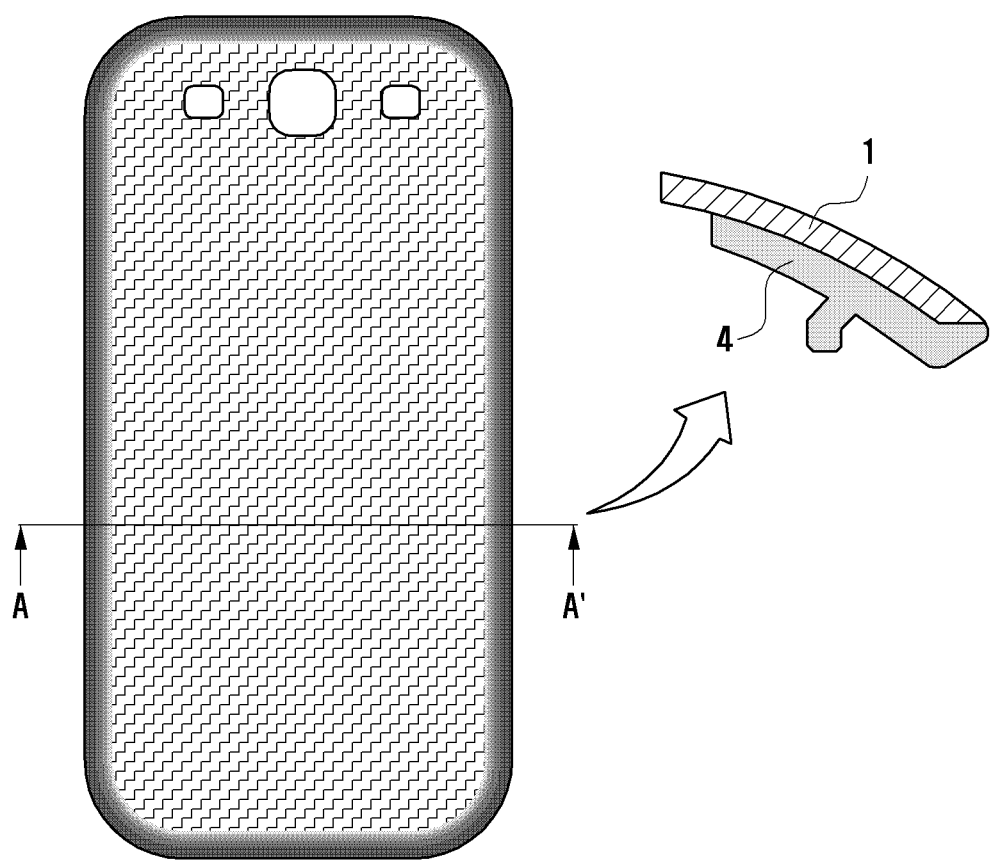
FIG. 8 is a cross-sectional view illustrating an external surface of a mobile terminal case and a structure by which the mobile terminal case can be fastened to internal parts according to an embodiment of the present invention.
Figure 9:
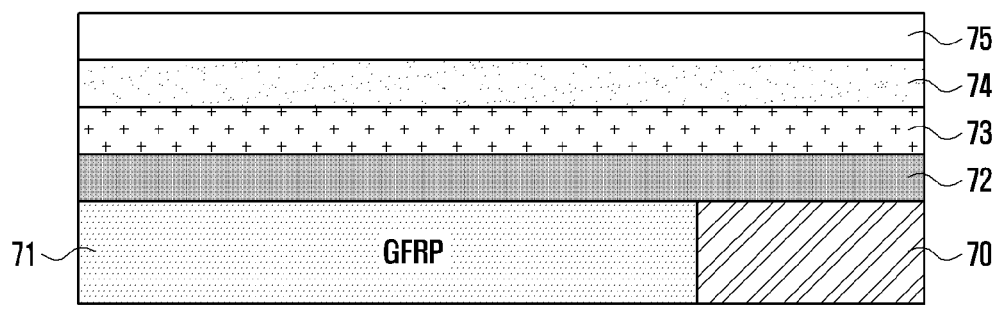
FIG. 9 is a cross-sectional view illustrating a paint layer of a predetermined thickness formed on the external surface of a mobile terminal case according to an embodiment of the present invention.
Figure 10:
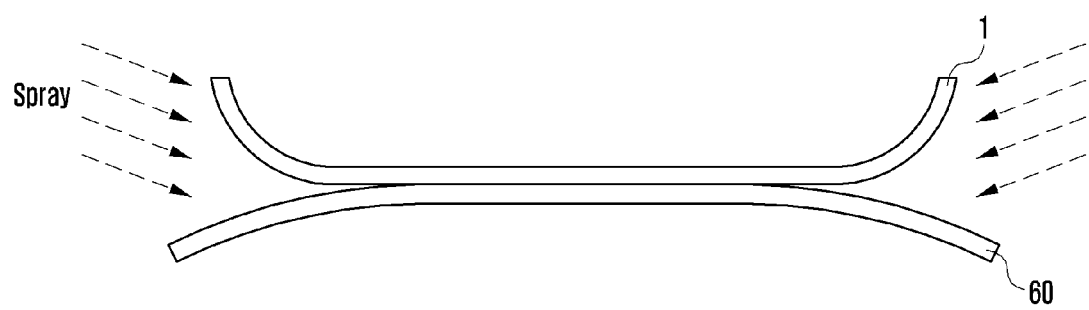
FIG. 10 is a diagram illustrating a spray process for forming a gradation paint layer on the external surface of a mobile terminal case according to an embodiment of the present invention.

FIG. 7 is a perspective view illustrating a mobile terminal case having a gradation paint layer on its external surface in accordance with an embodiment of the present invention, FIG. 8 is a cross-sectional view illustrating an external surface of a mobile terminal case and a structure in which the mobile terminal case is fastened to internal parts according to an embodiment of the present invention, FIG. 9 is a cross-sectional view illustrating a paint layer of a predetermined thickness formed on the external surface of a mobile terminal case according to an embodiment of the present invention, and FIG. 10 is a diagram illustrating a spray process for forming a gradation paint layer on the external surface of a mobile terminal case according to an embodiment of the present invention.

The mobile terminal case 1 shown in FIGS. 7 to 10 may be the mobile terminal case 1 formed with the fiber reinforced composite material described with reference to FIGS. 1 to 6.

By inserting a fiber reinforced composite material shaped in a three-dimensional curved surface form or plane shape into an injection mold and by performing plastic injection to an inside circumferential edge of the fiber reinforced composite material, a mobile terminal case 1 suitable for the processes discussed with reference to FIGS. 7 through 10 is produced.

The mobile terminal case 1 may be made of a fiber reinforced composite material stacked in at least one layer.

A plastic injection structure formed at a circumferential edge of the fiber reinforced composite material may be a fastening structure for enabling the mobile terminal case 1 to be fastened to the internal parts of the mobile terminal. That is, the structure may be a structure in which a plastic injection structure is overmolded at a circumferential edge (periphery) of the mobile terminal case 1.

A fastening structure formed by the plastic injection may be housed at only an inside surface of the mobile terminal case 1 or may be housed to be exposed to the outside and the present invention is not limited to either embodiment.

Referring to FIGS. 7 and 8, the mobile terminal case 1 according to the present embodiment includes gradation paint layers 2 and 3 on its external surface.

The gradation paint layers 2 and 3 may be formed with different levels of transparency in different areas by adjusting the paint level according to each area of the mobile terminal case 1. In this manner, the transparency of adjacent areas on the mobile terminal case 1 may be continuously changed.

In this embodiment, gradation paint layers 2 and 3 are painted so that a circumferential edge portion of the mobile terminal case 1 is most opaque and a central portion of the mobile terminal case 1 is most transparent.

Specifically, portions, except for a circumferential edge portion, of the mobile terminal case 1 may be translucently or transparently painted to show an outer surface of a fiber reinforced composite material having a predetermined pattern in a lower portion. Thereby, a predetermined pattern formed in the outer surface of the fiber reinforced composite material may be shown through the paint layers.

Advancing from the outer edge to the inside of the mobile terminal case 1, the transparency of the gradation paint layer 2 increases and thus a color of the gradation paint layer 3 gradually becomes lighter. Advancing from the inside to the outer edge of the mobile terminal case 1, the transparency of the gradation paint layer 2 decreases and thus a color of the gradation paint layer 3 gradually becomes darker.

Referring to FIG. 8, in order to prevent the fastening structure 4 for fastening the mobile terminal case 1 to the internal parts from being seen, a circumferential edge portion of the mobile terminal case 1 may be painted to be opaque. That is, an upper portion of the fastening structure 4 and an area of the mobile terminal case 1 adjacent to the fastening structure 4 are painted to be relatively opaque.

Specifically, the paint layer simultaneously covers the mobile terminal case 1 and the fastening structure 4.

In this manner, the fastening structure 4 of the mobile terminal case 1 may be hidden by the opaque paint layer.

Therefore, the mobile terminal case according to the present embodiment presents a unique pattern in its external appearance by using a gradation paint process on an injection molded composite material product while also preventing its internal parts from being shown, i.e., the internal parts of the mobile terminal case are hidden while still providing originality of design and enhanced external appearance, thereby providing a unique design.

The gradation paint layer may be formed with a spray construction method or may be formed with various known methods such as a mold construction method or a deposition construction method, as shown in FIG. 10.

The color of the gradation paint layer is not limited to a specific color and may be set according to the manufacturer's needs and intentions for the injection molded product.

FIG. 9 is a cross-sectional view illustrating a paint layer formed in a predetermined thickness on an external surface of a mobile terminal case according to an embodiment of the present invention.

Referring to FIG. 9, a gradation paint layer is formed in the plurality of layers stacked on the fiber reinforced composite material 71 and internal parts 70. The gradation paint layer is formed within the plurality of layers that includes the primer application layer 72, translucent coating layer 73, gradation coating layer 74, and clear coating layer 75.

By adjusting the transparency of the gradation coating layer 74, areas on the outer surface of the mobile terminal case can have different levels of transparency. According to the present embodiment of the present invention, the transparency of the gradation coating layer 74 is adjusted by the process described in reference to FIG. 10.

Referring to FIG. 10, when jig 60, having a three-dimensional curved surface shape with a circumferential edge lower than the center, contacts the outer surface of the mobile terminal case 1, only the center portion of the curved outer surface of the mobile terminal case 1 having the highest points comes into contact, and the remaining portions of the outer surface do not come into contact with the jig 60 and are separated by a predetermined gap from the jig 60.

Under these conditions, when the paint is sprayed on the outer surface of the mobile terminal case 1, it does not coat the central portion of the curved surface because that central portion is in contact with the jig 60. Only the portions separated by a predetermined gap from the jig 60 are coated by the spray.

Further, the quantity of coating by the spray decreases nearing the area where the outer surface and the jig 60 are in contact, and increases at areas further from the area whether the outer surface and the jig 60 are in contact.

Therefore, at an outer surface of the mobile terminal case 1 adjacent to a curve point, transparency of the paint layer 2 is high, and at an outer surface of the mobile terminal case 1 far from the curved point, transparency of the paint layer 3 is low and thus the outer surface presents a dark color.

Thereby, as a gradation paint process is performed, at an outer surface of the mobile terminal case 1, a gradation paint layer having different transparency may be formed in each area.

Figure 11:
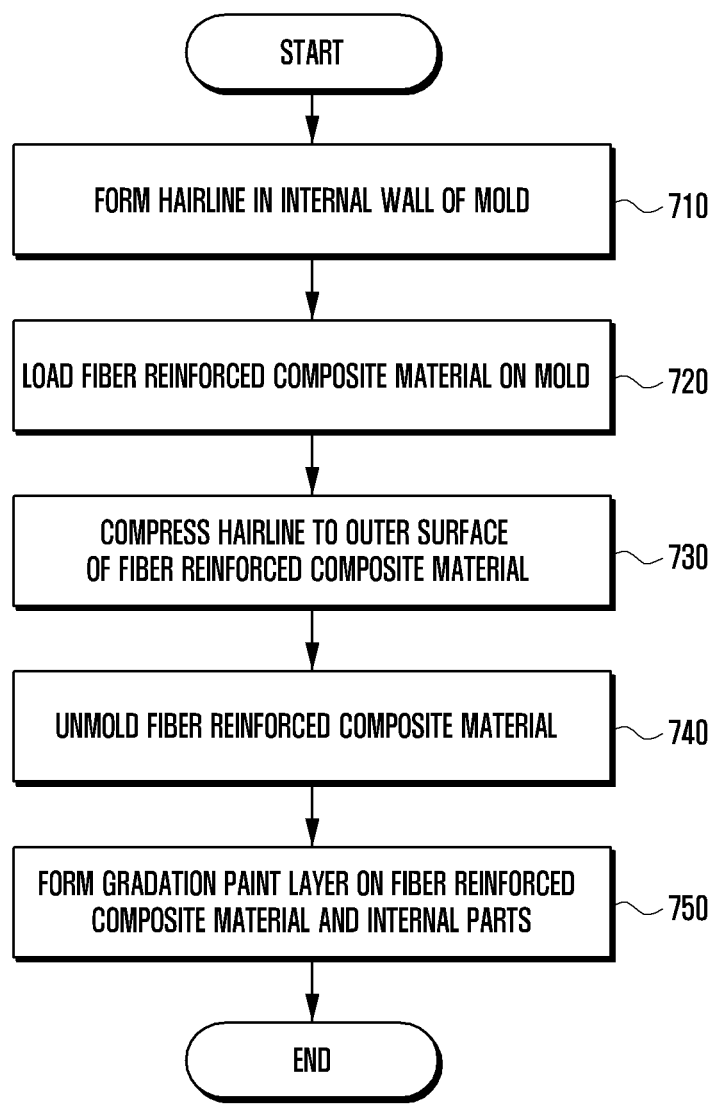
FIGS. 11 and 12 are flowcharts illustrating a method of manufacturing a mobile terminal case according to embodiments of the present invention.

FIG. 11 is a flowchart illustrating a method of manufacturing a mobile terminal case according to an embodiment of the present invention.

Referring to FIG. 11, a method of manufacturing a mobile terminal case according to an embodiment of the present invention includes step 710 of forming a hairline pattern in the internal wall of the injection mold 30, step 720 of loading a fiber reinforced composite material on the mold 30, step 730 of compressing the hairline pattern to an outer surface of the fiber reinforced composite material 20, step 740 of unmolding the fiber reinforced composite material 20, and step 750 of forming a gradation paint layer on the fiber reinforced composite material 20 and internal parts 70.

At step 710 of forming a hairline pattern in an internal wall of the injection mold, the injection mold 30 is engraved to a predetermined depth and shaped to form the mobile terminal case 1 with a fiber reinforced composite material 20.

By forming thin grooves, scratches, or unevenness to correspond to a desired design shape using laser or a grinding device at an internal surface of the injection mold, the predetermined pattern may be formed.

At step 720 of loading a fiber reinforced composite material 20 on the mold 30, a fiber reinforced composite material 20 is loaded in at least one layer on the injection mold 30.

At step 730 of compressing a hairline pattern to an outer surface of the fiber reinforced composite material 20 in a chamber environment of a predetermined high temperature and high pressure, the fiber reinforced composite material 20, having been loaded on the injection mold 30, contacts and is compressed to the injection mold 30.

That is, by vacuum compressing the sealed space in a predetermined chamber environment, the engraved hairline pattern contacts and is compressed to the outer surface of the fiber reinforced composite material 20 and thus the hairline pattern is formed at the outer surface of the fiber reinforced composite material 20.

At step 740 of unmolding the fiber reinforced composite material 20, the fiber reinforced composite material 20 in which the hairline pattern has been formed at the outer surface is unmolded from the mold 30.

At step 750 of forming a gradation paint layer on the fiber reinforced composite material 20 and internal parts 70, a gradation paint layer is simultaneously formed on the fiber reinforced composite material 20 and the internal parts 70.

Here, the gradation paint layers 2 and 3 may be formed with different levels of transparency according to the area on the outer surface of the mobile terminal case by adjusting a level of paint. In this manner, the transparency of adjacent areas on the mobile terminal case 1 may be continuously varied.

In one embodiment, the gradation paint layers 2 and 3 are painted so that the circumferential edge portion of the mobile terminal case 1 is most opaque and a central portion of the mobile terminal case 1 is most transparent.

In this specific embodiment, portions, except for the circumferential edge, of the mobile terminal case 1 are translucently or transparently painted so as to show the outer surface of the fiber reinforced composite material having a predetermined pattern in a lower portion. Thereby, the predetermined shaped pattern at an outer surface of the fiber reinforced composite material 20 shows through where the layers are translucent and/or transparent.

By gradation paint processing producing different levels of transparency on different areas in the external surface of a mobile terminal case formed from a fiber reinforced composite material, the central portion of the mobile terminal case can present a textile fabric impression in appearance, while the circumferential edge portion remains opaque, thereby preventing internal parts from being shown, i.e., the opaque circumferential edge hides the internal parts, and thus an enhanced external appearance and individualized design can be provided.

Figure 12:
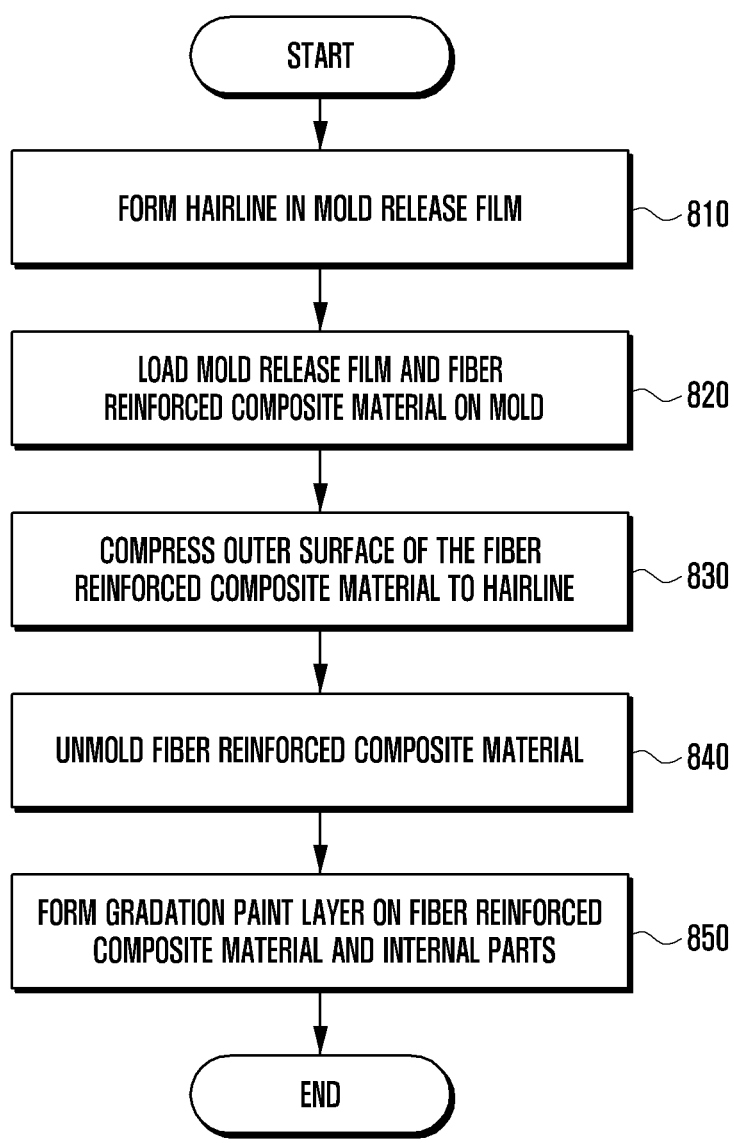

FIG. 12 is a flowchart illustrating a method of manufacturing the mobile terminal case according to an embodiment of the present invention.

Referring to FIG. 12, a method of manufacturing a mobile terminal case according to an embodiment of the present invention includes step 810 of forming a hairline pattern in a mold release film 40, step 820 of loading a mold release film 40 and a fiber reinforced composite material 20 on a mold 30, step 830 of compressing an outer surface of the fiber reinforced composite material 20 to the hairline pattern, step 840 of unmolding the fiber reinforced composite material 30, and step 850 of forming a gradation paint layer on the fiber reinforced composite material 20 and internal parts 70.

The hairline pattern formed in the mold release film 40 of step 810 may be formed by forming scratches, unevenness, or grooves using one or more lasers or various grinding devices at a surface of the mold release film 40.

At step 820 of loading a mold release film and a fiber reinforced composite material on a mold 30, the mold release film 40 is loaded on the mold 30 and then the fiber reinforced composite material 20 is loaded on the mold release film 40. The fiber reinforced composite material 20 may be loaded in at least one layer. A surface in which a hairline of the mold release film 40 is formed is loaded to face an outer surface of the fiber reinforced composite material 20.

Here, because the mold release film 40 includes a hairline pattern, the mold may be formed without any pattern.

At step 830 of compressing an outer surface of the fiber reinforced composite material 20 to the hairline pattern, in a chamber environment of a predetermined high temperature and high pressure, the mold release film 40 and the fiber reinforced composite material 20 having been loaded on the injection mold 30 in step 820, the fiber reinforced composite material 20 contacts the injection mold 30 and is compressed to the injection mold 30.

That is, in a predetermined chamber environment, by vacuum compressing within the sealed space, the outer surface of the fiber reinforced composite material 20 contacts the hairline pattern and is compressed to the hairline pattern and thus the hairline pattern is formed at an outer surface of the fiber reinforced composite material 20.

At step 840 of unmolding the fiber reinforced composite material 20, the fiber reinforced composite material 20 in which the hairline pattern has been formed in an outer surface is unmolded from the mold 30.

At step 850 of forming a gradation paint layer on a fiber reinforced composite material 20 and internal parts 70, a gradation paint layer may be simultaneously formed on the fiber reinforced composite material 20 and the internal parts 70.

Here, the gradation paint layers 2 and 3 are formed with different levels of transparency according by adjusting a level of paint according to the area of the mobile terminal case 1 being painted. In this manner, the transparency of adjacent areas on the mobile terminal case 1 may be continuously varied.

In this embodiment, the gradation paint layers 2 and are painted so that a circumferential edge portion of the mobile terminal case 1 is most opaque and a central portion of the mobile terminal case 1 is most transparent.

More specifically, portions, except for the circumferential edge, of the mobile terminal case 1 are translucently or transparently painted to show an outer surface of a fiber reinforced composite material having a predetermined pattern. Thereby, the predetermined shaped pattern at an outer surface of the fiber reinforced composite material may show through the translucent and/or transparent layers.

By gradation paint processing of different areas on the mobile terminal case with levels of transparency, the central portion of external surface of the mobile terminal case 1 presents a fabric impression, while the circumferential edge portion prevents the internal parts from being shown, i.e., the opaque paint layers thereon hide the internal parts, and thus an enhanced external appearance and individualized design can be provided.

As described above, in a mobile terminal case and a method of manufacturing the same according to the present invention, by providing a hairline pattern in the external surface of the mobile terminal case while it is being formed using injection molding of a fiber reinforced composite material, the design of the mobile terminal case can present individuality and an enhanced external appearance.

Further, in a mobile terminal case and a method of manufacturing the same according to the present invention, by preventing internal parts from being shown, i.e., by hiding the internal parts while also presenting a fabric impression in the external appearance of the mobile terminal case through a gradation paint processing, an enhanced external appearance and distinguished design can be provided.

Although embodiments of the present invention have been described in detail hereinabove, it should be clearly understood that many variations and modifications of the basic inventive concepts herein described, which may appear to those skilled in the art, will still fall within the spirit and scope of the present invention as defined in the appended claims.

What is claimed is:

1. A mobile terminal case, comprising:
    a three-dimensional curved body having an outer surface with a circumferential edge lower than a center, the three-dimensional curved body being formed from a fiber reinforced composite material and the outer surface being engraved with a hairline pattern during formation, the hairline pattern being a geometric pattern of scratches, unevenness, or grooves formed in the outer surface of the fiber reinforced composite material; and
    a gradation paint layer formed on the outer surface of the three-dimensional curved body formed of the fiber reinforced composite material,
    wherein the gradation paint layer has a low transparency only on portions of the mobile terminal case that correspond to fastening areas where internal parts of a mobile terminal are fastened to the mobile terminal case, so as to hide all of the internal parts and reveal the hairline pattern more clearly as transparency of the gradation paint layer increases, and
    wherein the gradation paint layer is formed on the fiber reinforced composite material and the internal parts by sequentially loading a primer application layer, a translucent coating layer, a gradation coating layer, and a clear coating layer.

2. The mobile terminal case of claim 1, wherein the fiber reinforced composite material comprises a prepreg material comprising at least one of glass fiber reinforced plastic, carbon fiber reinforced plastic, aramid fiber (Kevlar) reinforced plastic, boron fiber reinforced plastic, and basalt fiber reinforced plastic.

3. The mobile terminal case of claim 1, wherein the gradation paint layer is formed at varying thicknesses and is thereby gradated with different levels of transparency on different areas of the outer surface.

4. The mobile terminal case of claim 3, wherein the gradation paint layer of an area facing the internal parts housed at an inside of the case has relatively low transparency.

5. The mobile terminal case of claim 1, wherein the gradation paint layer of portions of the outer surface adjacent to the center has continuously changing transparency.

6. The mobile terminal case of claim 1, wherein the gradation paint layer of portions adjacent to the center have a high transparency and the gradation paint layer of portions adjacent to an outer edge have the low transparency.

7. The mobile terminal case of claim 6, wherein the gradation paint layer is graduated between the portions adjacent to the center having the high transparency and the portions adjacent to the outer edge having the low transparency.

* * * * *